INVENTORS
Ronald L. Colling &
BY Jack H. Perry

Hugh L. Fisher
ATTORNEY

United States Patent Office 3,291,246
Patented Dec. 13, 1966

3,291,246
DELAYED AUTOMATIC LOCK-UP SPEED CONTROL AND SPEED WARNING SYSTEM
Ronald L. Colling, Davison, and Jack H. Perry, Fenton, Mich., assignors to General Motors Corporation, Detroit, Mich., a corporation of Delaware
Filed Sept. 29, 1964, Ser. No. 400,090
15 Claims. (Cl. 180—82.1)

This invention relates to a control system for a motor vehicle and more particularly to a system which provides, in one mode of operation, a warning to the vehicle operator when a predetermined vehicle speed is reached and in another mode of operation maintains the vehicle at a desired road speed under varying load conditions. Devices of this nature are sometimes referred to as vehicle cruise controls and several devices of this nature have been offered at various times in the automotive accessory market.

One of the functions of speed control systems is to control the road speed of the vehicle at a preselected value on highways without the necessity of the driver holding the accelerator pedal depressed. For safety reasons such systems are provided with a switch on the brake pedal in series with a part of the system's control circuit so that the circuit is deenergized whenever the brake pedal is depressed. To reset the system, it is necessary to again accelerate the vehicle until it reaches the preselected speed and then to push a control button which may be mounted on the instrument panel to again lock in the control circuit.

It is desirable to have the control circuit automatically re-engaged without the necessity of operating the separate button or control member each time the vehicle has been decelerated.

Such systems have been proposed in the past. There are, however, disadvantages associated with such automatic lock-up cruise control systems. If, for example, the vehicle is in the cruise mode of operation and is traveling at a preselected speed, the driver may desire because of traffic conditions to disengage the system and take over manual control of the throttle but still be able to drive at a speed corresponding to the preselected speed which may, for example, be the highway speed limit. In the prior automatic lock-up control systems, this is not possible because the system will automatically lock-up once again as soon as the vehicle is accelerated to the preselected speed. Thus, it is necessary, in order to maintain manual control, for the driver to travel at a speed below the preselected speed or to manually reset the speed control mechanism to a higher speed. This problem is even more apparent where the cruise control system utilizes a speed transducer having a proportional zone of speed control since in such a system lock-up would tend to occur even before the preselected set speed had been reached.

The present invention obviates the disadvantages of the prior art by providing time delay means which will prevent the system from locking-up until the vehicle has been accelerated to a speed above the preselected speed. Thereafter, the speed control mechanism is operative to maintain the vehicle at the preselected speed under varying load conditions. The operator may then disengage the system if he so desires by touching the brake pedal but still manually maintain the preselected speed without the system automatically locking up.

A more complete understanding of the present invention may be had from the following detailed description which should be read in conjunction with the drawings in which.

Figure 1:
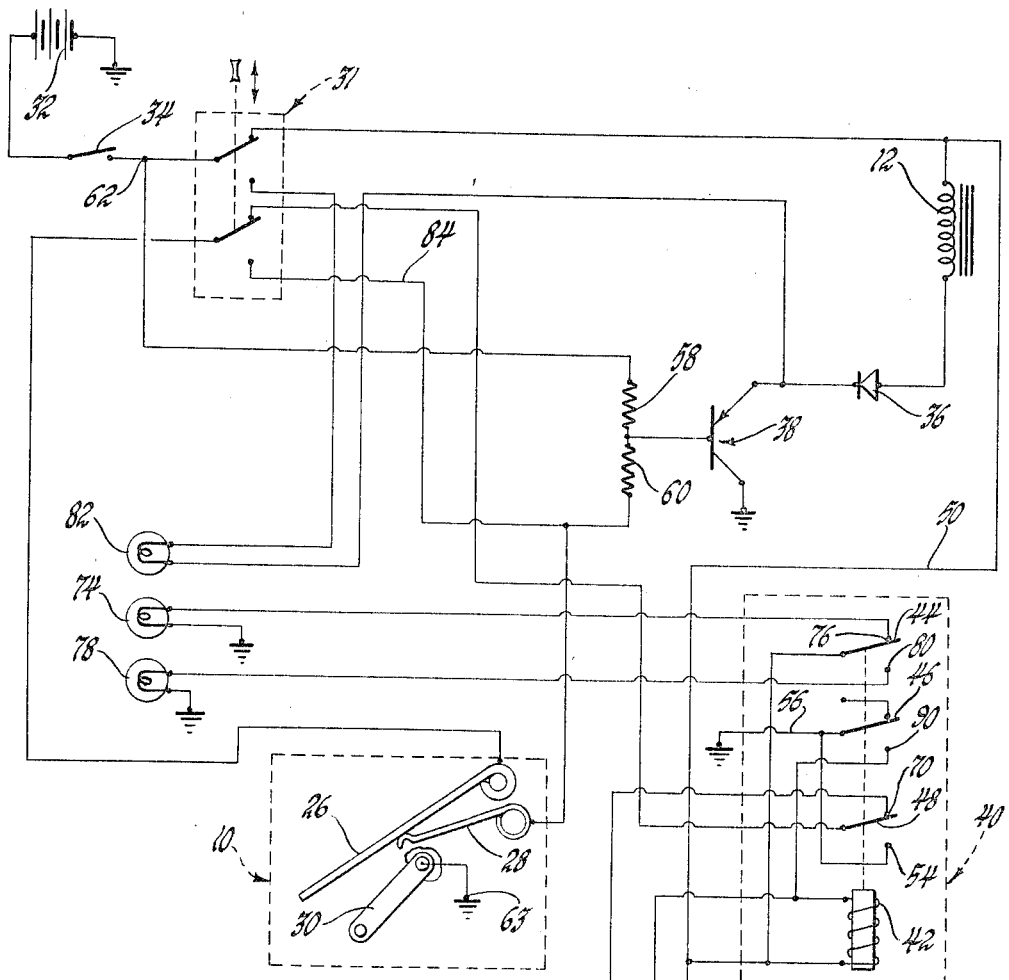
FIGURE 1 is a schematic representation of the control system of the present invention.
Figure 2:
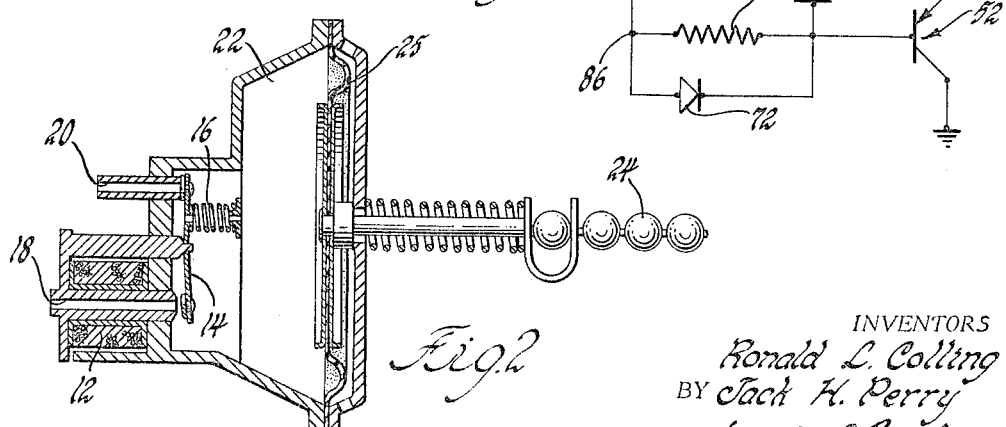
FIGURE 2 is a cross sectional view of a power unit for controlling vehicle engine speed.

Referring now to the drawings and initially to FIGURE 1, the speed control system of the present invention comprises a speed transducer generally designated 10 which is responsive to a preselected speed input and the actual prevailing road speed as measured by the speedometer and provides a speed error output in the form of a pulse modulated electrical signal which controls the energization of a solenoid coil 12 which in turn controls the engine speed of the vehicle through the power unit shown in FIGURE 2.

Referring to FIGURE 2, the solenoid coil 12 operates a diaphragm type power unit. When the solenoid coil 12 is energized, a valve armature 14 is pulled in against a spring 16 closing an atmosphere port 18 and opening a vacuum port 20 to a diaphragm chamber 22. Increasing vacuum admitted to the diaphragm chamber 22 increases tension on the bead chain 24 which connects the vehicle throttle (not shown) with a diaphragm 25. This produces an open throttle signal to the engine. Conversely, when the solenoid coil is deenergized, the vacuum port 20 is closed and the atmosphere port 18 is opened to the diaphragm chamber 22 producing a close throttle signal to the engine.

The speed transducer 10 is schematically represented in FIGURE 1 and includes a contact spring 26, an oscillator spring contact 28, and a contact pin 30. Such a speed transducer is disclosed in U.S. Patents 3,087,340 and 3,088,537 assigned to the assignee of the present invention. Reference is therefore made to these patents for a more complete description of the detailed construction of the speed transducer.

As more fully explained in the aforementioned patents, the oscillator spring 28 is adapted to be manually positioned at a preselected desired speed carrying with it the contact spring 26. The oscillator arm 28 is operative in response to the movement of an eccentric cam mounted on the input shaft of the speedometer to oscillate through a range of proportional control which may be, for example, 4 m.p.h. above and below the set speed. The contact pin 30 is positioned in accordance with the road speed of the vehicle and as the contact pin 30 begins to invade the range of oscillation of the contact spring 26 and the oscillating spring 28, the contacts 26 and 28 are held open an interval of time dependent upon the position of the contact pin within the range of proportional control. At 4 m.p.h. below the set speed, the contacts 26 and 28 are continuously closed. At the set speed, the contacts 26 and 28 are closed the same amount of time as they are opened. At 4 m.p.h. above the set speed, the contacts 26 and 28 remain opened continuously.

A double-pole double-throw switch 31 is adapted to connect the system in either the automatic lock-up mode of operation or in a speed warning mode of operation. As shown the switch 31 connects one side of the solenoid coil 12 to a battery 32 through a brake release switch 34. The other side of the solenoid coil 12 is connected to a diode 36 and to the emitter and collector electrodes of a transistor switching amplifier 38 to ground.

An automatic lock-up relay is generally designated 40 and includes a relay coil 42 and armatures 44, 46 and 48. One side of the relay coil 42 is connected to the battery 32 through the conductor 50. The other side of the relay coil 42 is connected through the emitter collector path of a transistor amplifier 52 to ground.

The contact spring 26 is connected to ground through the normally opened contact 54 of the relay 40 and the conductor 56. The oscillator spring contact 28 is connected to the battery 32 through the resistors 58 and 60 and the junction 62. The contact pin 30 is grounded at 63. The junction of the resistors 58 and 60 is connected to the base of switching amplifier 38.

An RC circuit consisting of a capacitor 64 and a resistor 68 has one side thereof connected to the battery 32 through the conductor 50 and the other side thereof connected to the contact spring 26 through the normally closed contact 70 of the relay 40. The junction between the capacitor 64 and the resistor 68 is connected to the base of the transistor 52. A diode 72 is connected in shunt with the resistor 68.

An automatic tell-tale lamp 74 is connected across the source 32 through a normally closed contact 76 of the relay 40 and the conductor 50. A cruise tell-tale lamp 78 is connected across the source 32 through the conductor 50 and the normally open contact 80 of the relay 40.

When the engage switch 31 is in the speed warning position, an overspeed tell-tale lamp 82 is connected across the battery 32 through the emitter collector path of the switching amplifier 38 and the resistor 60 is connected to the contact spring 26 through the conductor 84.

CRUISE MODE OF OPERATION

With the engage switch 31 in the automatic position, the automatic tell-tale lamp 74 will be energized through the normally closed contact 76 of the relay 40. With the speed of the vehicle below the range of proportional control, the contact pin 30 will be completely out of engagement with the contact spring 26 as is shown in FIGURE 1. The plus terminal of the battery 32 is connected to both sides of the capacitor 64 and no current flows through the relay coil 42 since the emitter and base of the amplifier 52 are at essentially the same potential. The switching amplifier 38 is also off since the positive terminal to the battery 32 is connected to the emitter through the solenoid coil 12 and to the base through the resistor 58. The solenoid coil 12 is therefore deenergized.

As the vehicle speed increases, the speedometer spindle (not shown) rotates in a direction of increasing speed causing the contact pin 30 to approach the position of the oscillating spring contact 28. When the vehicle speed is such that the contact pin 30 is positioned at the lower part of the oscillator spring contact travel and touching the contact spring 26, a square wave of varying duty cycle and whose amplitude is either battery potential or ground appears at junction 86 of the resistors 68 and diode 72. At this time the voltage at the base of transistor 52 starts to decay from battery potential toward ground. The further the contact pin 30 rotates clockwise, the longer the contact spring 26 is held at ground potential and the lower the potential at the base of the transistor 52 becomes. The time constant of resistor 68 and capacitor 64 determines how wide the ground portion of the square wave from the junction 86 must be to lower the base of the transistor 52 to the point where the transistor 52 will turn on. Diode 72 provides a quick discharge path for the capacitor 64 when the junction 86 returns to battery potential and eliminates the effect of the emitter-base resistor of transistor 52 as a discharge path.

At a predetermined speed above the set speed, the contact pin 30 will be in engagement with the contact spring 26 long enough for the base of transistor 52 to be driven negative with respect to the emitter such that the emitter collector current is sufficient to energize the relay coil 42, transferring the armatures 44, 46 and 48 into engagement with the contacts 80, 90 and 54, respectively. A holding circuit for the relay coil 42 is provided through the contact 90 such that once the relay coil 42 is energized, it will remain energized irrespective of the current flowing through the transistor 52. In other words, the connection of the armature 46 to the contact 90 provides a ground path through the conductor 56 bypassing the emitter collector path of the transistor 52.

When the relay 40 is energized, battery potential is removed from the automatic tell-tale lamp 74 and applied to the cruise tell-tale lamp 78 through the contact 80. This extinguishes the automatic tell-tale lamp and energizes the cruise tell-tale lamp. The energization of the relay coil 42 also provides a constant ground connection to the contact spring 26 through the contact 54 of the relay 40 and the conductor 56.

With the contact spring 26 grounded, whenever the contact spring 26 rests on the oscillator spring contact 28, resistor 60 is grounded and the base of transistor 38 is biased negative with respect to the emitter turning the transistor 38 on. Thus with the relay 40 locked up and the vehicle speed less than the set speed, i.e., the contact pin 30 being below the oscillator spring proportional zone, the resistor 60 is grounded by the contact spring 26 and the transistor 38 conducts thereby energizing the solenoid coil 12. If the vehicle speed is above the set speed, i.e., the contact pin 30 lifting the contact spring 26 off the oscillator spring contact 28, the resistor 60 is lifted from ground and the transistor 38 turns off deenergizing the solenoid coil 12. At intermediate speeds within the range of proportional control, the solenoid coil 12 is alternately energized and deenergized. As indicated previously the energization of the solenoid coil 12 increases the vehicle speed and deenergization of the solenoid coil 12 decreases the engine speed.

SPEED WARNING MODE OF OPERATION

When the engage switch 31 is moved to the speed warning position, battery voltage is applied across the overspeed tell-tale lamp 82 through the emitter-collector path of the transistor 38. When the vehicle speed is below the set speed, that is when the contact pin 30 is out of engagement with the contact spring 26, the transistor 38 is off because the resistor 60 is connected to the contact spring 26 through the conductor 84. When the vehicle speed reaches the set speed, the contact pin which is electrically grounded at 63, intermittently engages the contact spring 26. The contact spring 26 is moved into and out of engagement with the contact pin 30 by the oscillation of the oscillator spring contact 28. Whenever resistor 60 is grounded, transistor 38 turns on energizing the overspeed tell-tale lamp 82. Thus the overspeed tell-tale lamp 82 is flashed in an intermittent manner. Diode 36 prevents current flow through the overspeed tell-tale lamp 82 by way of the solenoid coil 12 and the automatic tell-tale lamp 74.

While only a preferred embodiment of the invention has been disclosed, this should not be construed in a limiting sense. Modification thereto will now be apparent to those skilled in the art. For a definition of the invention, reference should be made to the appended claims.

We claim:

1. An automatic lock-up speed control system for a motor vehicle, said system comprising a source of power, vehicle throttle control means for controlling the speed of said vehicle, on-off switching means connected between said source and said throttle control means, speed transducer means responsive to the speed of said vehicle for controlling said on-off switching means and for maintaining the speed of said vehicle at a predetermined set speed, additional control means responsive to the speed of said vehicle for controlling said speed transducer means whereby said speed transducer means is initially rendered incapable of controlling said on-off switching means until said vehicle speed is above said set speed.

2. An automatic lock-up speed control system for a motor vehicle, said system comprising a source of power, vehicle throttle control means for controlling the speed of said vehicle, on-off switching means connected between said source and said throttle control means, speed transducer means responsive to a desired speed input and the actual speed of said vehicle and when operative, adapted to control said on-off switching means to maintain said vehicle speed at the desired set speed, additional control means responsive to the actual speed of said vehicle, relay means for rendering said speed transducer means operative, said additional means adapted to energize said relay means when the speed of said vehicle is above said desired speed.

3. An automatic lock-up speed control system for a motor vehicle, said system comprising a source of power, first means for controlling the engine speed of said vehicle, switching means responsive to the speed of said vehicle for connecting said first means to said source when the vehicle speed is below a desired set speed, second means responsive to vehicle speed for preventing initial closure of said switching means until the speed of said vehicle is a predetermined level above said set speed.

4. An automatic lock-up speed control system for a motor vehicle, comprising speed transducer means responsive to a desired speed input and an actual speed input to provide a speed error output, vehicle engine speed control means, time delay means responsive to the speed of said vehicle for providing an output only when the speed of said vehicle is above said desired speed, switching means responsive to the output of said time delay means for connecting the output of said speed transducer means to said engine speed control means.

5. An automatic lock-up speed control system for a motor vehicle, said system comprising speed transducer means responsive to a desired speed input and an actual speed input to provide a speed error output, vehicle engine speed control means, a source of electrical power, on-off switching means responsive to the output of said speed transducer means for connecting said engine speed control means across said source, time delay means connected to said source of power and responsive to the speed of said vehicle for providing an output only when the speed of said vehicle is above said desired speed, additional switching means responsive to the output of said time delay means for connecting the output of said speed transducer means to said on-off switching means.

6. An automatic lock-up speed control system comprising vehicle engine speed control means, speed transducer means operative upon the application of a reference potential thereto control the energization of said engine speed control means in response to the speed of the vehicle for maintaining said vehicle at a desired speed, additional control means responsive to vehicle speed for controlling the application of said reference potential to said transducer means whereby said reference potential is initially applied to said transducer means only after the speed of said vehicle is above said desired speed.

7. An automatic lock-up speed control system for a motor vehicle, said system comprising speed transducer means responsive to a desired speed input and an actual speed input to provide a speed error output, a source of electrical power, vehicle engine speed control means, on-off switching means responsive to the output of said speed transducer means for connecting said engine speed control means across said source, amplifying means, time delay means for controlling the output of said amplifying means and adapted to be connected across said source for a time interval dependent upon the speed of said vehicle, relay means responsive to the output of said amplifying means, the output of said amplifying means being sufficient to energize said relay means upon said time delay means being connected across said source for a time interval related to a speed of said vehicle which is a predetermined level above said desired speed, said relay means adapted upon energization thereof to connect the output of said speed transducer means to said on-off switching means.

8. The system claimed in claim 7 wherein said relay means includes holding circuit means adapted to maintain the relay means in an energized condition after initial energization of the relay means.

9. The system claimed in claim 7 wherein further switching means are connected between said source and said relay means and operatively associated with the brake pedal of said vehicle for deenergizing said relay means upon movement of the brake pedal.

10. The system claimed in claim 7 wherein said time delay means includes a capacitor and a resistor.

11. An automatic lock-up speed control system for a motor vehicle, said system comprising a source of electrical power, a transistor amplifier having emitter, collector and base electrodes, relay switching means including a relay coil, the emitter and collector electrodes of said amplifier connecting said relay coil across said source, a resistor and a capacitor having the junction thereof connected to the base of said amplifier, speed transducer means including first contact means movable in response to the speed of said vehicle and further including oscillating contact means oscillating in the path of said first contact means and within a constant range of vehicle speed which includes a desired speed, a vehicle engine speed control mechanism, transistor switching means for connecting said mechanism across said source, said speed transducer means adapted upon energization of said relay to control the operation of said transistor switching means, said first contact means connecting said resistor and capacitor across said source when in engagement with said oscillating contact means, the connection of said resistor and capacitor across said source for a predetermined time causing said amplifier to conduct sufficiently to energize said relay coil.

12. The system claimed in claim 11 wherein said relay includes holding circuit means adapted to maintain the relay coil in an energized condition after initial energization of the relay coil.

13. The system claimed in claim 12 wherein a brake release switch is connected between said source and said relay coil.

14. The system claimed in claim 11 wherein a diode is connected in shunt with said resistor.

15. An automatic lock-up speed control system for a motor vehicle, said system comprising vehicle engine speed control means, speed transducer means responsive to a desired speed input and an actual speed input for developing a speed control signal, time delay means responsive to said speed control signal for developing an output signal when said actual speed is above said set speed, lock-up means responsive to said output signal for connecting said speed transducer means to said speed control means whereby said speed control means is energized in accordance with said speed control signal.

References Cited by the Examiner
UNITED STATES PATENTS

| | | | |
|---|---|---|---|
| 2,837,168 | 6/1958 | Sabater | 180—82.1 |
| 3,070,185 | 12/1962 | Fales | 123—10 X |
| 3,077,239 | 2/1963 | Simas | 180—82.1 |
| 3,185,248 | 5/1965 | Baxter | 123—103 X |
| 3,198,280 | 8/1965 | Van Ostrom | 180—82.1 |
| 3,213,872 | 10/1965 | Schniers | 180—82.1 X |

KENNETH H. BETTS, *Primary Examiner.*